(12) United States Patent
Mizuno

(10) Patent No.: US 10,834,501 B2
(45) Date of Patent: Nov. 10, 2020

(54) INFORMATION PROCESSING METHOD, INFORMATION PROCESSING DEVICE, AND RECORDING MEDIUM

(71) Applicant: Panasonic Intellectual Property Corporation of America, Torrance, CA (US)

(72) Inventor: Ko Mizuno, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/541,801

(22) Filed: Aug. 15, 2019

(65) Prior Publication Data
US 2020/0077184 A1 Mar. 5, 2020

(30) Foreign Application Priority Data

Aug. 28, 2018 (JP) .................................. 2018-159399
May 15, 2019 (JP) .................................. 2019-092403

(51) Int. Cl.
*H04R 3/00* (2006.01)
*G10L 25/51* (2013.01)
*H04R 1/40* (2006.01)

(52) U.S. Cl.
CPC .............. *H04R 3/005* (2013.01); *G10L 25/51* (2013.01); *H04R 1/406* (2013.01)

(58) Field of Classification Search
CPC .......... H04R 3/005; H04R 1/406; G10L 25/51
See application file for complete search history.

(56) References Cited

U.S. PATENT DOCUMENTS

| | | | |
|---|---|---|---|
| 9,197,177 B2* | 11/2015 | Zong | H04R 3/005 |
| 2009/0207131 A1 | 8/2009 | Togami et al. | |
| 2015/0373474 A1* | 12/2015 | Kraft | H04W 4/029 |
| | | | 381/17 |
| 2016/0086619 A1* | 3/2016 | Pogorelik | H03G 3/32 |
| | | | 381/57 |
| 2016/0210834 A1* | 7/2016 | Dayal | A61H 3/061 |
| 2016/0352913 A1* | 12/2016 | Wu | H04M 1/605 |
| 2020/0031337 A1* | 1/2020 | Soltanian | B60W 30/0956 |

FOREIGN PATENT DOCUMENTS

JP 4926091 5/2012
JP 5079761 11/2012

* cited by examiner

*Primary Examiner* — Simon King
(74) *Attorney, Agent, or Firm* — Wenderoth, Lind & Ponack, L.L.P.

(57) ABSTRACT

An information processing method includes obtaining an audio signal that represents sound collected by a sound collecting device; calculating, using the audio signal obtained, a volume of the sound collected by the sound collecting device; identifying, using the audio signal obtained, a type of a sound source of the sound collected by the sound collecting device; estimating a distance between the sound collecting device and the sound source of the sound collected by the sound collecting device based on a standard volume and the volume calculated, the standard volume being (i) stored in a database in which the type of the sound source and the standard volume are preassociated with each other, (ii) the volume of the sound from the sound source at a predetermined distance, and (iii) associated with the type of the sound source identified; and outputting an estimation result.

18 Claims, 8 Drawing Sheets

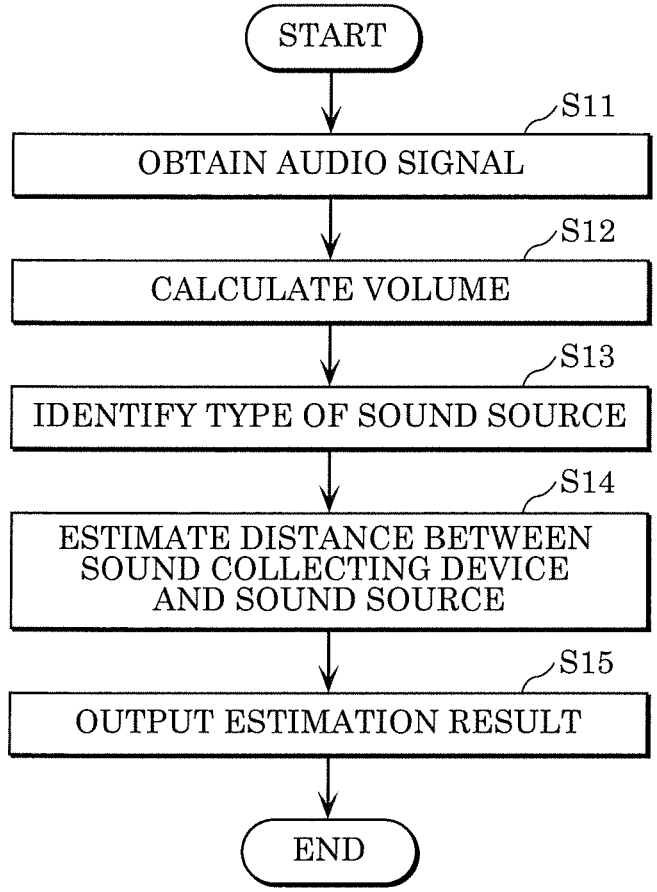

INFORMATION PROCESSING METHOD, INFORMATION PROCESSING DEVICE, AND RECORDING MEDIUM

CROSS REFERENCE TO RELATED APPLICATIONS

This application claims the benefit of priority of Japanese Patent Application Number 2018-159399 filed on Aug. 28, 2018 and Japanese Patent Application Number 2019-92403 filed on May 15, 2019, the entire contents of which are hereby incorporated by reference.

BACKGROUND

1. Technical Field

The present disclosure relates to an information processing method, an information processing device, and a recording medium.

2. Description of the Related Art

Techniques for estimating the position of a sound source (particularly the distance between a microphone and the sound source) have been disclosed. For example, Japanese Patent No. 4926091 discloses a technique for estimating the position of a sound source through triangulation using microphones disposed in different positions. For example, Japanese Patent No. 5079761 discloses a technique for estimating the position of a sound source by precompiling sound collected by microphones when sound sources have been disposed in multiple positions in a space. By being able to estimate the position of a sound source using these techniques, an environment of sound in a space in which microphones have been disposed (sound field) can, for example, be reproduced in different location. For example, when having remote teleconferences and the like, it is possible to create an environment in which conversation partners get the impression they are talking to each other in the same room. Additionally, the techniques can also be applied to, for example, public screenings or online games.

The technique disclosed in the above Japanese Patent No. 4926091 requires, for example, sound collecting devices (microphones) to be disposed in multiple positions. The technique disclosed in the above Japanese Patent No. 5079761 requires, for example, the above database to be created in advance, and further requires the above database to be created for each space so that the database is unique for each space. In other words, with the techniques disclosed in the above Japanese Patent No. 4926091 and Japanese Patent No. 5079761, estimating the distance between a sound collecting device and a sound source requires a great deal of work.

Accordingly, the present disclosure aims to provide an information processing method and the like that makes it possible to easily estimate the distance between a sound collecting device and a sound source.

SUMMARY

An information processing method according to an aspect of the present disclosure includes obtaining an audio signal that represents sound collected by a sound collecting device; calculating, using the audio signal obtained, a volume of the sound collected by the sound collecting device; identifying, using the audio signal obtained, a type of a sound source of the sound collected by the sound collecting device; estimating a distance between the sound collecting device and the sound source of the sound collected by the sound collecting device based on a standard volume and the volume calculated, the standard volume being (i) stored in a database in which the type of the sound source and the standard volume are preassociated with each other, (ii) the volume of the sound from the sound source at a predetermined distance, and (iii) associated with the type of the sound source identified; and outputting an estimation result.

Note that these comprehensive or concrete aspects of the present disclosure may be implemented as a system, device, method, recording medium, or computer program, and may also be implemented by optionally combining systems, devices, methods, recording media, and computer programs.

The information processing method and the like according to the present disclosure makes it possible to easily estimate the distance between a sound collecting device and a sound source.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 2 is a flowchart showing an example of an operation of the information processing device according to Embodiment 1;

FIG. 3 is a table showing an example of a database;

DETAILED DESCRIPTION OF THE EMBODIMENTS

Figure 1:
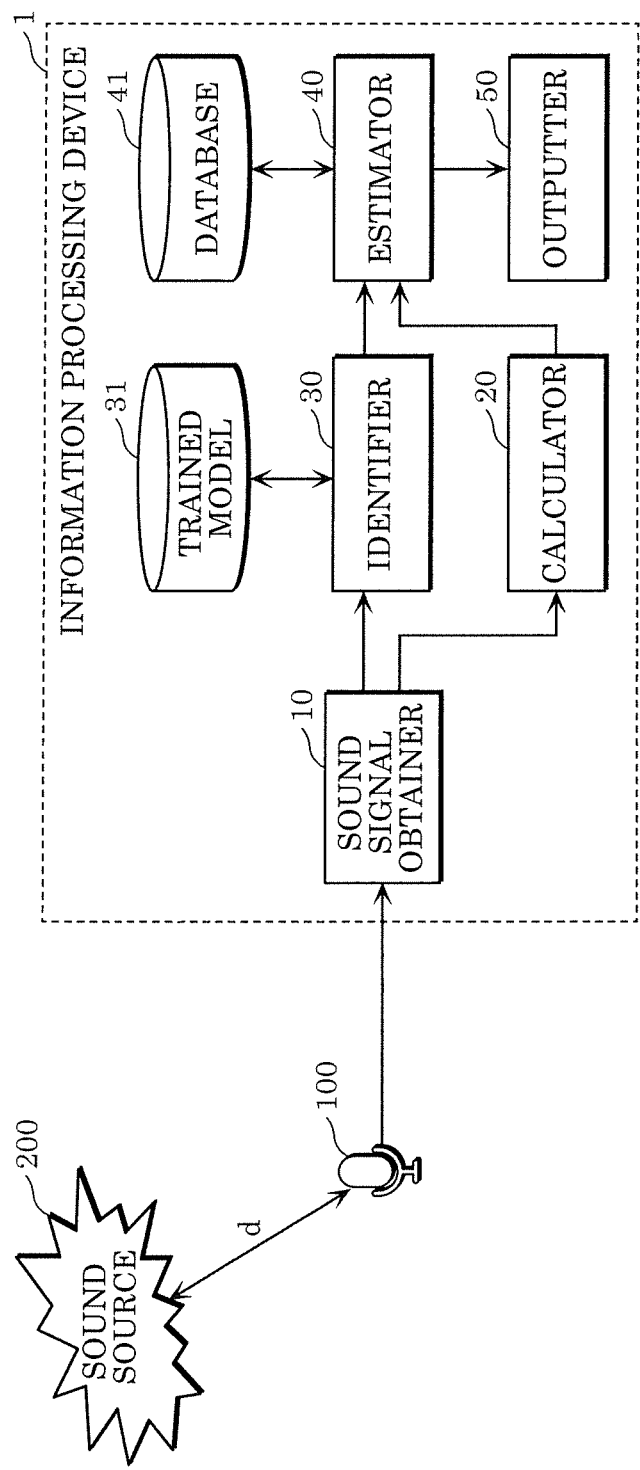
FIG. 1 is a block diagram showing an example of a configuration of an information processing device according to Embodiment 1.

An information processing method according to an aspect of the present disclosure includes obtaining an audio signal that represents sound collected by a sound collecting device; calculating, using the audio signal obtained, a volume of the sound collected by the sound collecting device; identifying, using the audio signal obtained, a type of a sound source of the sound collected by the sound collecting device; estimating a distance between the sound collecting device and the sound source of the sound collected by the sound collecting device based on a standard volume and the volume calculated, the standard volume being (i) stored in a database in which the type of the sound source and the standard volume are preassociated with each other, (ii) the volume of the sound from the sound source at a predetermined distance, and (iii) associated with the type of the sound source identified; and outputting an estimation result.

This makes it possible, when premeasuring the standard volume with respect to the sound of various types of sound sources and pregenerating the database, to calculate the volume of the sound collected by the sound collecting device in a space in which the estimating of the distance to the sound source is performed, and to easily estimate the distance between the sound collecting device and the sound source simply by identifying the type of the sound source of the sound.

The information processing method may include estimating the distance based on a relational expression that is predetermined and denotes a relationship between (i) an amount of attenuation of the volume calculated with respect to the standard volume and (ii) the distance.

This makes it possible, since there is a relation between the amount of attenuation of the volume and the distance, to more easily estimate the distance between the sound collecting device and the sound source by using the predetermined relational expression that indicates the relation.

The information processing method may include identifying the type of the sound source of the sound collected by the sound collecting device using (i) a trained model trained with an audio signal that represents an optional sound as input data, and a type of a sound source of the optional sound as label data, and (ii) the audio signal obtained.

This makes it possible to easily identify the type of the sound source of the sound collected by the sound collecting device by using the trained model that is machine trained.

The information processing method may further include calculating a feature value of the audio signal when the type of the sound source of the sound collected by the sound collecting device is not identifiable using the audio signal obtained; obtaining distance information that indicates the distance between the sound collecting device and the sound source of the sound collected by the sound collecting device; and associating the feature value calculated with the volume calculated at the distance indicated by the distance information obtained, and registering the feature value and the volume as the standard volume in the database.

This makes it possible to henceforward estimate, for types of sound sources that could not be identified, the distance between the sound collecting device and the sound source of the sound having the feature value since the feature value of the sound from the sound source and the standard volume are compiled into the database.

The information processing method may include isolating the audio signal per sound source when the audio signal obtained represents sound from a plurality of sound sources; and performing, for each sound signal isolated, the calculating of the volume, the identifying of the type, the estimating of the distance, and the outputting of the estimation result.

This makes it possible to easily estimate the distance to the sound collecting device for each of the plurality of sound sources.

The information processing method may include determining whether the type of the sound source identified is a sound source that outputs audible sound or inaudible sound; and estimating the distance in accordance with a determination result. To be specific, the information processing method may include estimating the distance based on a relational expression that is predetermined and denotes a relationship between (i) an amount of attenuation of the volume calculated with respect to the standard volume and (ii) the distance. The relational expression may include a relational expression predetermined for when the type of the sound source identified is the sound source that outputs audible sound and a relational expression predetermined for when the type of the sound source identified is the sound source that outputs inaudible sound.

This makes it possible to estimate the distance between the sound collecting device and the sound source that outputs audible sound, and the distance between the sound collecting device and the sound source that outputs inaudible sound.

The sound collecting device may be a microphone array including a plurality of microphones. The method may further include estimating an orientation of the sound source of the sound with respect to the sound collecting device based on a difference in sound collecting time at which the sound is collected respectively by the plurality of microphones.

This makes it possible to accurately estimate a position of the sound source using (i) the distance between the sound collecting device and the sound source of the sound collected by the sound collecting device, and (ii) the orientation of the sound source with respect to the sound collecting device.

The information processing method may include accumulating, per distance estimation, a correspondence relationship between the type of the sound source of the sound and the estimation result of the distance between the sound collecting device and the sound source; determining a precision of the identifying of the type of the sound source based on (i) the correspondence relationship accumulated and (ii) the estimation result of the distance between the sound collecting device and the sound source of the sound collected by the sound collecting device; and feeding back and using a determination result in the identifying of the type of the sound source.

This makes it possible to improve the precision of the identifying of the type of the sound source.

An information processing device according to an aspect of the present disclosure includes audio signal obtainer that obtains an audio signal that represents sound collected by a sound collecting device; a calculator that calculates, using the audio signal obtained, a volume of the sound collected by the sound collecting device; an identifier that identifies, using the audio signal obtained, a type of a sound source of the sound collected by the sound collecting device; an estimator that estimates a distance between the sound collecting device and the sound source of the sound collected by the sound collecting device based on a standard volume and the volume calculated, the standard volume being (i) stored in a database in which the type of the sound source and the standard volume are preassociated with each other, (ii) the volume of the sound from the sound source at a predetermined distance, and (iii) associated with the type of the sound source identified; and an outputter that outputs an estimation result.

This makes it possible to provide an information processing device that can easily estimate the distance between the sound collecting device and the sound source.

A computer program according to an aspect of the present disclosure causes a computer to execute the above information processing method.

This makes it possible to provide a computer program that can easily estimate the distance between the sound collecting device and the sound source.

Hereinafter, embodiments will be concretely described with reference to the drawings.

Note that each of the embodiments described below shows a comprehensive or specific example in the present disclosure. Numerical values, shapes, materials, components, placement and connection of the components, steps and their order, and the like are mere examples and are not intended to limit the present disclosure. Components in the following embodiments not mentioned in any of the independent claims that define the broadest concepts are described as optional elements.

Embodiment 1

Hereinafter, Embodiment 1 will be described with reference to FIGS. 1 to 3.

FIG. 1 is a block diagram showing an example of a configuration of information processing device 1 according to Embodiment 1. Note that FIG. 1 shows sound collecting device 100 and also sound source 200 of sound produced in a position d (m) away from sound collecting device 100 in a space in which sound collecting device 100 is disposed.

Information processing device 1 is a device for estimating the distance between sound collecting device 100 and sound source 200 of the sound collected by sound collecting device 100. Information processing device 1 is a computer disposed proximate to the space in which sound collecting device 100 is disposed, a server device disposed in a location different from the space, or the like. Information processing device 1 may be integrated to sound collecting device 100, and may also be, for example, a portable device. In other words, the distance between the position of sound collecting device 100, i.e., the current location, and the position of sound source 200 may also be determined while carrying information processing device 1 that is integrated to sound collecting device 100.

Sound collecting device 100 is, for example, one microphone. Sound collecting device 100 converts an audio signal (electrical signal) of the collected sound and outputs the audio signal to information processing device 1. Sound collecting device 100 is disposed in a space (e.g. a room) where the distance to the sound source is estimated. Sound collecting device 100 and information processing device 1 are connected by wire or wirelessly.

As illustrated in FIG. 1, information processing device 1 includes audio signal obtainer 10, calculator 20, identifier 30, trained model 31, estimator 40, database 41, and outputter 50. Information processing device 1 is a computer including a processor (microprocessor), user interface, communication interface (e.g. communication circuit that is not illustrated), memory, and the like. The user interface includes, for example, a display such as a liquid crystal display (LCD) or an input device such as a keyboard or a touch panel. The memory is read-only memory (ROM), random-access memory (RAM), or the like, and can contain a control program (computer program) to be executed by the processor. Note that information processing device 1 may include one memory, and may also include multiple memories. The one or multiple memories contain trained model 31 and database 41 which will be described later.

Audio signal obtainer 10, calculator 20, identifier 30, estimator 40, and outputter 50, being functional components included in the processor, are implemented due to the processor operating in accordance with the control program. Processes in which the processor controls the communication interface, user interface, and the like are performed due to the processor operating in accordance with the control program. Note that audio signal obtainer 10a, identifier 30a, estimators 40a and 40b, calculator 60, distance information obtainer 70, registerer 80, and determiner 90 in Embodiments 2 to 5, which will be described later, are also implemented due to the processor operating in accordance with the control program.

Audio signal obtainer 10, calculator 20, identifier 30, trained model 31, estimator 40, database 41, and outputter 50 will be described with reference to FIG. 2.

FIG. 2 is a flowchart showing an example of an operation of information processing device 1 according to Embodiment 1.

Audio signal obtainer 10 first obtains the audio signal that represents the sound collected by sound collecting device 100 (step S11). To be specific, audio signal obtainer 10 obtains the audio signal due to the communication interface included in information processing device 1 receiving the audio signal output (transmitted) from sound collecting device 100. Note that the sound collected by sound collecting device 100 is sound from sound source 200.

Calculator 20 calculates, using the audio signal obtained by audio signal obtainer 10, a volume of the sound collected by sound collecting device 100 (step S12). Detailed description of the calculating of the volume is omitted for being too general, but the volume can be calculated using, for example, the amplitude and the like represented by the audio signal (electrical signal).

Identifier 30 next identifies, using the audio signal obtained by audio signal obtainer 10, a type of sound source 200 of the sound collected by sound collecting device 100 (step S13). For example, identifier 30 identifies the type of sound source 200 of the sound collected by sound collecting device 100 using (i) trained model 31 trained with an audio signal that represents an optional sound as input data, and a type of a sound source of the optional sound as label data, and (ii) the audio signal obtained by audio signal obtainer 10. Note that the audio signal may also be converted to a frequency spectrum, etc. and be used as the input data. Trained model 31 is, for example, a neural network. Hereinafter, trained model 31 being trained with a "male voice" as the type of the sound source will be described.

A large number of audio signals in which it is known that they represent a male voice as the optional sound are first prepared. These prepared audio signals representing a male voice are then input to trained model 31 as the input data, and trained model 31 is trained so that the audio signals are labeled as "male voice". With this, when inputting an audio signal whose type is unknown to trained model 31 that has finished training, "male voice" will be output as correct answer from trained model 31 when the type of the audio signal is "male voice".

In FIG. 2, the identifying of the type of sound source 200 is performed after the calculating of the volume, but the calculating of the volume may also be performed after the identifying of the type of sound source 200. In other words, the order of step S12 and step S13 may also be the other way around. The calculating of the volume and the identifying of the type of sound source 200 may also be performed in parallel.

Estimator 40 next estimates the distance between sound collecting device 100 and sound source 200 of the sound collected by sound collecting device 100 based on a standard volume and the volume calculated by calculator 20, the standard volume being (i) stored in database 41 in which the type of sound source 200 and the standard volume are preassociated with each other, (ii) the volume of the sound from the sound source at a predetermined distance, and (iii)

associated with the type of the sound source identified by identifier 30 (step S14). Database 41 will be described with reference to FIG. 3.

FIG. 3 is a table showing an example of database 41.

Generally speaking, the volume of the sound is fixed to a certain degree depending on the type of the sound source. Accordingly, with regard to various types of sound sources, the volume of the sound from the sound source at the predetermined distance from the sound source is measured as the standard volume. This makes it possible to create database 41 in which the various types of sound sources and the standard volume are associated with each other. FIG. 3 shows an example of the standard volumes of "male voice", "female voice", "car noise", "sound of vacuum cleaner", and "sound of running water" when the predetermined distance is 1 m. Note that since the volume of human voices differ from person to person, a voice and its standard volume may, for example, be associated with each other and compiled into a database per person by measuring the standard volume of human voices used in the space in which sound collecting device 100 is disposed.

To be specific, estimator 40 estimates the distance between sound collecting device 100 and sound source 200 based on a relational expression that is predetermined and denotes a relationship between (i) an amount of attenuation of the volume calculated by calculator 20 with respect to the standard volume and (ii) the distance between sound collecting device 100 and the sound source of the sound collected by sound collecting device 100. An example of the relational expression is shown below with Expression 1.

MATH 1

$$d = r \times 10^{(A0-A/20)} \quad \text{Expression 1}$$

In Expression 1, d (m) indicates the distance between sound collecting device 100 and sound source 200, r (m) indicates the predetermined distance, A0 (dB) indicates the standard volume at the predetermined distance, and A (dB) indicates the volume calculated by calculator 20. In Expression 1, sound source 200 is considered as a point sound source.

For example, when the type of sound source 200 of the sound collected by sound collecting device 100 identified by identifier 30 is a "male voice", the standard volume at the predetermined distance of 1 m associated with the type "male voice" in database 41 is 55 dB. The volume calculated by calculator 20 at this point is 43 dB. In this case, estimator 40 estimates the distance between sound collecting device 100 and sound source 200 at approximately 4 m by assigning r as 1, A0 as 55, and A as 43 in Expression 1.

Outputter 50 outputs an estimation result of estimator 40 (step S15). Outputter 50, for example, outputs an estimation result to a device such as a user interface included in information processing device 1 or a portable terminal or server device that can communicate with information processing device 1. Note that outputter 50 may not only output the distance between sound collecting device 100 and sound source 200, but also the type of the sound source, etc. as the estimation result.

As described above, it is possible, when premeasuring the standard volume with respect to the sound of various types of sound sources and pregenerating the database, to calculate the volume of the sound collected by the sound collecting device in a space in which the distance to the sound source is estimated, and to easily estimate the distance between the sound collecting device and the sound source simply by identifying the type of the sound source of the sound. To be specific, in order to estimate the distance, disposing sound collecting device 100 in multiple positions and creating a unique database for every space do not require a great deal of work. Therefore, the estimating of the distance between sound collecting device 100 and sound source 200 can now be performed easily even in spaces where the estimating of the distance was not performed hitherto due to requiring too much work, and it is possible to increase the spaces in which the distance is to be performed.

Since there is a relation between the distance and the amount of attenuation of the volume, it is possible to more easily estimate the distance between sound collecting device 100 and sound source 200 by using the predetermined relational expression (e.g. Expression 1) that indicates the relation.

It is possible to easily identify the type of sound source 20 of the sound collected by sound collecting device 100 by using trained model 31 that is machine trained.

Embodiment 2

Embodiment 2 will be described next with reference to FIGS. 4 and 5.

Figure 4:
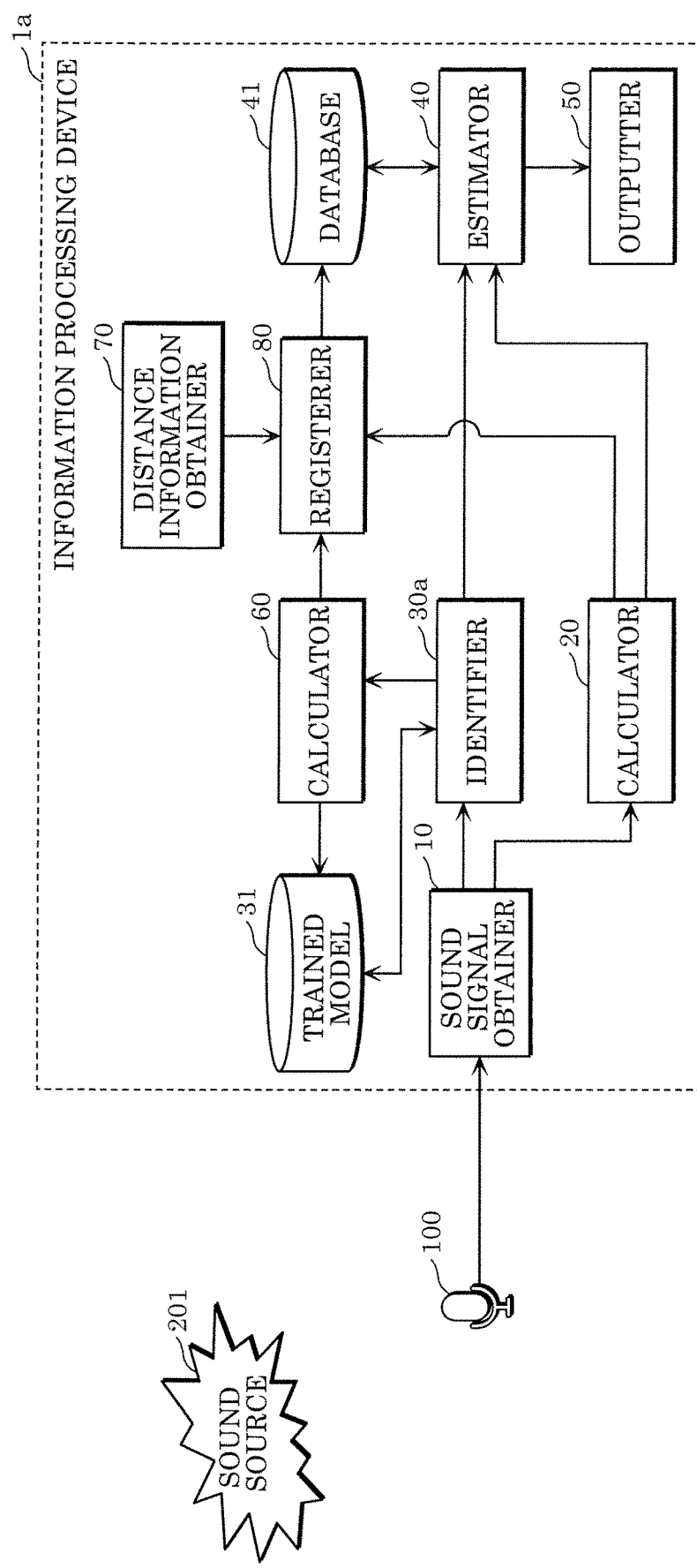
FIG. 4 is a block diagram showing an example of a configuration of an information processing device according to Embodiment 2.

FIG. 4 is a block diagram showing an example of a configuration of information processing device 1a according to Embodiment 2.

Information processing device 1a according to Embodiment 2 differs from information processing device 1 according to Embodiment 1 in that information processing device 1a includes identifier 30a instead of identifier 30, and further includes calculator 60, distance information obtainer 70, and registerer 80. Since other items are the same as information processing device 1 in according to Embodiment 1, description thereof is omitted and the above differences will be mainly described with reference to FIG. 5.

Note that in Embodiment 2, the type of sound source 201 of the sound produced in the space in which sound collecting device 100 is disposed is not used to train trained model 31, and the type of sound source 201 and the standard volume associated with the type of sound source 201 are not included in database 41.

Figure 5:
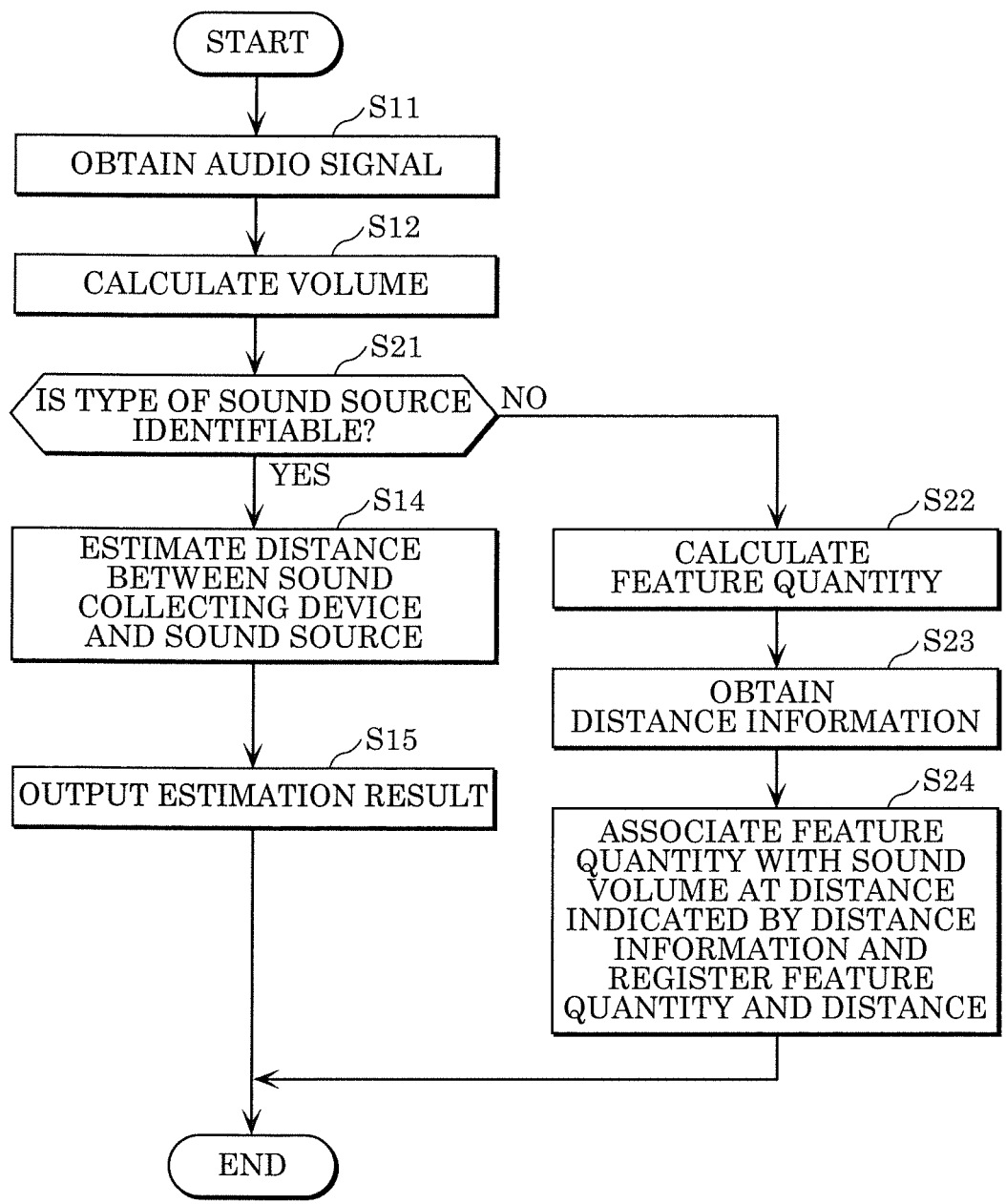
FIG. 5 is a flowchart showing an example of an operation of the information processing device according to Embodiment 2.

FIG. 5 is a flowchart showing an example of an operation of information processing device 1a according to Embodiment 2.

Identifier 30a identifies a type of sound source 201 of the sound collected by sound collecting device 100 using the audio signal obtained by audio signal obtainer 10 similar to step S13 in FIG. 2. At this point, identifier 30a determines, for example, whether the type of sound source 201 is identifiable (step S21). For example, when trained model 31 is trained using the type of sound source 201 of the sound produced in the space in which sound collecting device 100 is disposed, identifier 30a can identify the type of sound source 201. When trained model 31 is not trained using the type of sound source 201, identifier 30a cannot identify the type of sound source 201. When identifier 30a determines that the type of sound source 201 is identifiable (Yes in step S21), the processes of step S14 and step S15 are performed similar to Embodiment 1.

When identifier 30a determines that the type of sound source 201 is not identifiable (No in step S21), calculator 60 calculates a feature value of the audio signal obtained by audio signal obtainer 10 (step S22). The feature value indicates features of the audio signal, and is, for example, a frequency spectrum. The feature value is, for example, stored in a memory and the like containing trained model 31.

Distance information obtainer 70 obtains distance information that indicates the distance between sound collecting device 100 and sound source 201 of the sound collected by sound collecting device 100 (step S23). For example, in the space in which sound collecting device 100 is disposed, a user actually measures the distance between sound collecting device 100 and sound source 201, and distance information obtainer 70 obtains the distance information due to the user inputting a measurement result via the user interface included in information processing device 1 or via a portable terminal and the like that can communicate with information processing device 1.

Registerer 80 associates the feature value calculated by calculator 60 with the volume calculated by calculator 20 at the distance indicated by the distance information obtained by distance information obtainer 70, and registering the feature value and the volume as the standard volume in database 41 (step S24). As stated above, since the standard volume is the volume of the sound from the sound source at the predetermined distance from the sound source, the predetermined distance pertaining to the feature value is the distance indicated by the distance information obtained by distance information obtainer 70, and the standard volume is the volume calculated by calculator 20. For example, when the distance indicated by the distance information obtained by distance information obtainer 70 is 2 m and the volume calculated by calculator 20 is 49 dB, then the feature value calculated by calculator 60 is associated with a standard volume of 49 dB at a predetermined distance of 2 m in database 41.

Henceforward, the distance between a sound source of the same type as sound source 201 (i.e., sound source producing sound with the same feature value; referred to as equivalent sound source) and sound collecting device 100 can be estimated. To be specific, identifier 30a determines, using the audio signal, that type of sound source 201 of the sound collected by sound collecting device 100 is identifiable by checking if a feature value equal to the feature value of the audio signal that represents the sound from the equivalent sound source obtained by audio signal obtainer 10 is stored in the memory. In other words, even when trained model 31 is not trained using the type of the equivalent sound source, the type of the sound source is no longer determined to be unidentifiable (i.e., No in step S21), and the distance estimation process can be continued.

Estimator 40 estimates the distance between sound collecting device 100 and sound source 201 of the sound collected by sound collecting device 100 based on (i) the standard volume associated with the feature value identified by identifier 30, and (ii) the volume of the sound from the equivalent sound source calculated by calculator 20, in database 41 in which the feature value registered by registerer 80 is associated with the standard volume at the distance indicated by the distance information obtained by distance information obtainer 70. For example, the volume calculated by calculator 20 is 43 dB. In this case, since the standard volume is 49 dB at the predetermined distance of 2 m as stated above, estimator 40 estimates the distance between sound collecting device 100 and the equivalent sound source at approximately 4 m by assigning r as 2, A0 as 49, and A as 43 in Expression 1.

As described above, it is possible to henceforward estimate, for a type of sound source 201 that could not be identified, the distance between sound collecting device 100 and the sound source of the sound having the feature value since the feature value of the sound of sound source 201 and the standard value are compiled into the database.

Note that the method may include (i) training trained model 31 using the audio signal the represents the sound from sound source 201 as the input data and the type of sound source 201 as the label data, and (ii) and updating trained model 31 so that trained model 31 can correspond to the unknown sound source 201.

Embodiment 3

Embodiment 3 will be described next with reference to FIG. 6.

Figure 6:
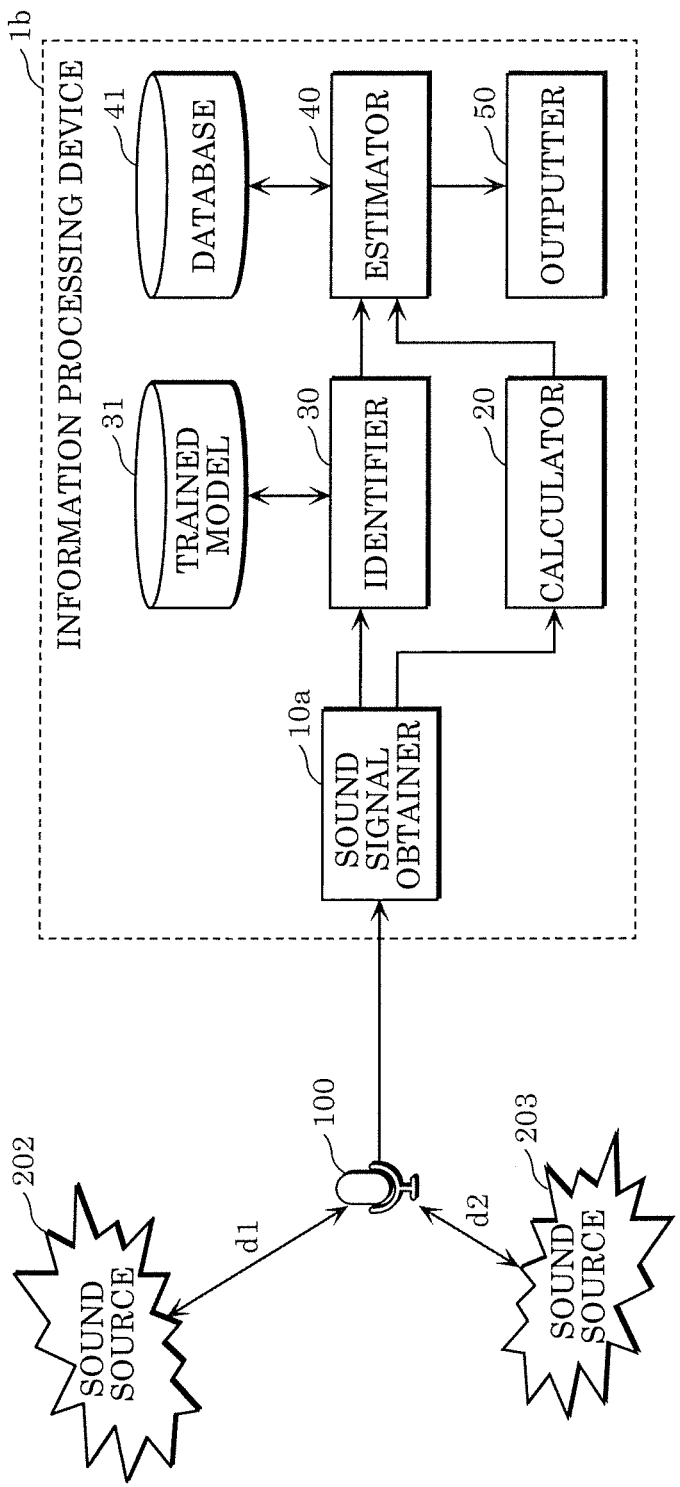
FIG. 6 is a block diagram showing an example of a configuration of an information processing device according to Embodiment 3.

FIG. 6 is a block diagram showing an example of a configuration of information processing device 1b according to Embodiment 3.

Information processing device 1b according to Embodiment 3 differs from information processing device 1 according to Embodiment 1 in that information processing device 1b includes audio signal obtainer 10a instead of audio signal obtainer 10. Since other items are the same as information processing device 1 in according to Embodiment 1, description thereof is omitted and the above differences will be mainly described.

Audio signal obtainer 10a isolates the audio signal for both sound sources 202 and 203 when the obtained audio signal represents sound from sound sources 202 and 203. Detailed description of the technique for isolating the audio signal per sound source from sound signals including sound components from multiple sound sources is omitted for being too general, but the isolation method is not particularly limited. Calculator 20 performs the calculating of the volume, identifier 30 performs the indentifying of the type, estimator 40 performs the estimating of the distance, and outputter 50 performs the outputting of the estimation result, for each isolated sound signal. In other words, estimator 40 estimates distance d1 for sound source 202 and distance d2 for sound source 203.

Note that information processing device 1b may include multiple groups of calculator 20, identifier 30, and estimator 40, and each of the isolated signals may be processed in parallel. This makes it possible to respectively estimate distances d1 and d2 for sound sources 202 and 203 in real time.

As described above, it is possible to easily estimate the distances between from both sound sources 202 and 203 to sound collecting device 100 by isolating the sound signals for both sound sources 202 and 203 when the obtained sound signals represent sound from sound sources 202 and 203.

Embodiment 4

Embodiment 4 will be described next with reference to FIG. 7.

Figure 7:
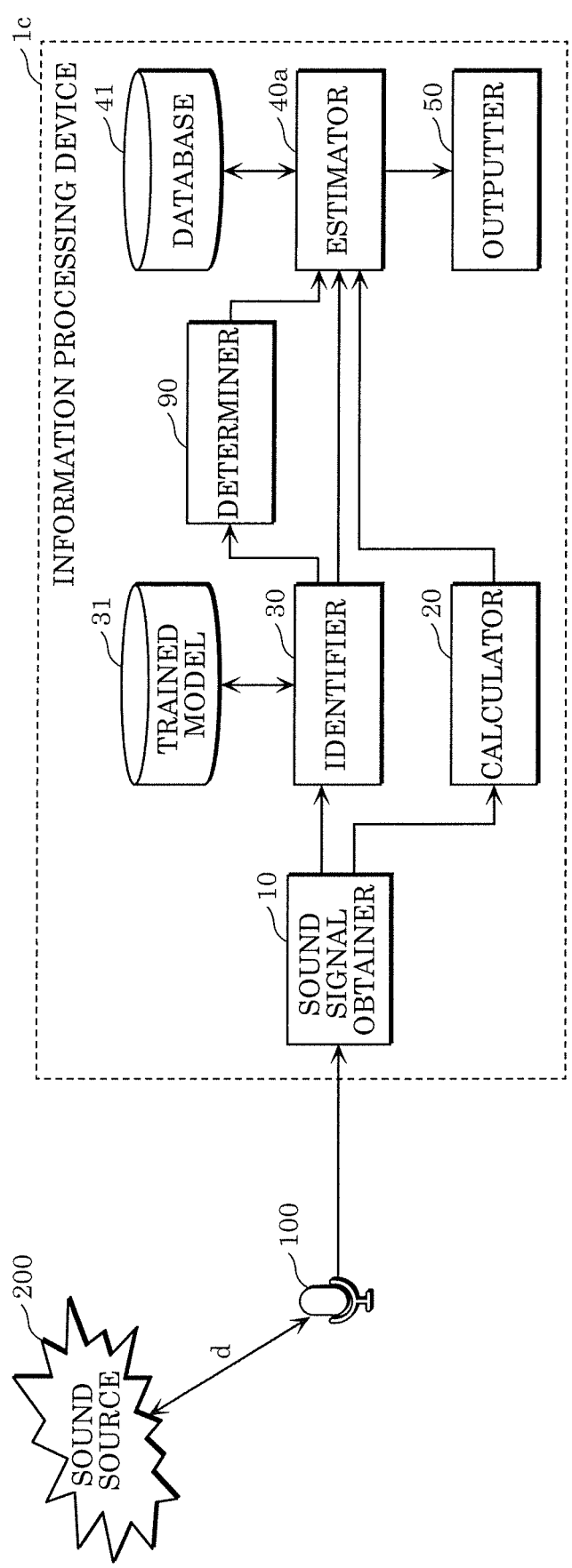
FIG. 7 is a block diagram showing an example of a configuration of an information processing device according to Embodiment 4.

FIG. 7 is a block diagram showing an example of a configuration of information processing device 1c according to Embodiment 4.

Information processing device is according to Embodiment 4 differs from information processing device 1 according to Embodiment 1 in that information processing device 1c includes estimator 40a instead of estimator 40, and further includes determiner 90. Since other items are the same as information processing device 1 in according to Embodiment 1, description thereof is omitted and the above differences will be mainly described.

Determiner 90 determines whether the type of sound source 200 identified by identifier 30 is a sound source that outputs audible sound or inaudible sound. For example, determiner 90 can determine whether the type of sound source 200 identified by identifier 30 is a sound source that outputs audible sound or inaudible sound using the frequency spectrum and the like of the audio signal obtained by audio signal obtainer 10.

Estimator 40a estimates the distance between sound collecting device 100 and sound source 200 in accordance with a determination result of determiner 90. To be specific, estimator 40a estimates the distance between sound collecting device 100 and sound source 200 based on a relational expression that is predetermined and denotes a relationship between (i) an amount of attenuation of the volume calculated by calculator 20 with respect to the standard volume and (ii) the distance between sound collecting device 100 and the sound source, similar to estimator 40. The relational expression includes a relational expression predetermined for when the type of sound source 200 identified by identifier 30 is the sound source that outputs audible sound and a relational expression predetermined for when the type of sound source 200 identified by identifier 30 is the sound source that outputs inaudible sound. This is because the amount of attenuation of the volume differs between audible sound and audible sound depending on the distance. For example, when sound source 200 is a type of sound source that outputs audible sound, the relational expression is Expression 1. On the other hand, when sound source 200 is a type of sound source that outputs inaudible sound, the relational expression is different from Expression 1. Inaudible sound includes ultrasound and infrasound, thus, the relational expression differs between ultrasound and infrasound.

As described above, it is possible to estimate the distance (i) between sound collecting device 100 and sound source 200 that outputs audible sound and (ii) sound collecting device 100 and sound source 200 that outputs inaudible sound.

For example, it is possible to estimate the distance between sound collecting device 100 and sound source 200 that outputs ultrasound as inaudible sound. To be specific, when a problem occurs in the devices, ultrasound is produced from a part where a problem has occurred, and it becomes possible to identify the device in which the problem has occurred. Since the contents of the problem and the frequency of the ultrasound are sometimes associated with each other, the contents of the problem may be output along with the estimation result.

For example, it is possible to estimate the distance between sound collecting device 100 and sound source 200 that outputs ultrasound as the inaudible sound. To be specific, when a tornado occurs, infrasound is produced from the tornado and it is possible to estimate the distance to where the tornado has occurred. Note that in this case, the space in which sound collecting device 100 is disposed is several tens of kilometers large including an exterior thereof.

Embodiment 5

Embodiment 5 will be described next with reference to FIG. 8.

Figure 8:
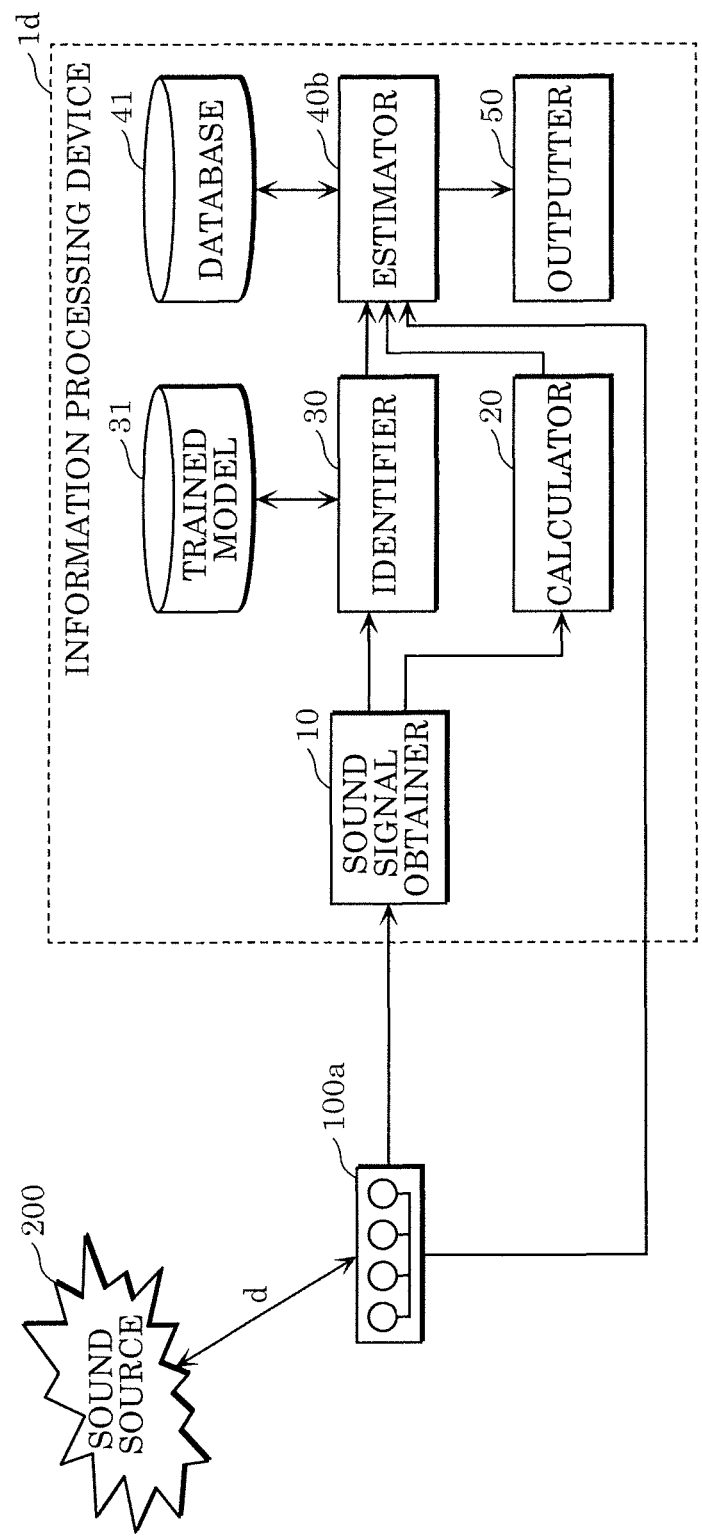
FIG. 8 is a block diagram showing an example of a configuration of an information processing device according to Embodiment 5.

FIG. 8 is a block diagram showing an example of a configuration of information processing device 1d according to Embodiment 5.

Information processing device 1d according to Embodiment 5 differs from information processing device 1 according to Embodiment 1 in that information processing device 1d includes estimator 40b instead of estimator 40. Embodiment 5 also differs from Embodiment 1 in that sound collecting device 100a instead of sound collecting device 100 is disposed in the space in which the distance is estimated. Since other items are the same as information processing device 1 in according to Embodiment 1, description thereof is omitted and the above differences will be mainly described.

In Embodiment 5, sound collecting device 100a is a microphone array including a plurality of microphones. The microphones are disposed in different positions in sound collecting device 100a. With this, the sound from sound source 200 reaches each microphone at different times.

Estimator 40b estimates the distance between sound collecting device 100a and sound source 200 using the audio signal of the sound collected by and of the plurality of microphones included in sound collecting device 100a, similar to estimator 40, and further estimates an orientation of sound source 200 of the sound with respect to sound collecting device 100a based on a difference in sound collecting time at which the sound is collected respectively by the plurality of microphones. Estimator 40b can estimate the orientation of sound source 200 with respect to sound collecting device 100a using (i) the positional relationship of the microphones, and (ii) the difference in time at which the sound from sound source 200 is collected by each microphone (difference in sound collecting time).

As described above, since it is possible to estimate the orientation of sound source 200 with respect to sound collecting device 100a, it is also possible to accurately estimate the position of sound source 200 by using (i) the distance between sound collecting device 100a and sound source 200 of the sound collected by sound collecting device 100a, and (ii) the orientation of sound source 200 with respect to sound collecting device 100a.

Embodiment 6

Embodiment 6 will be described next with reference to FIG. 9.

Figure 9:
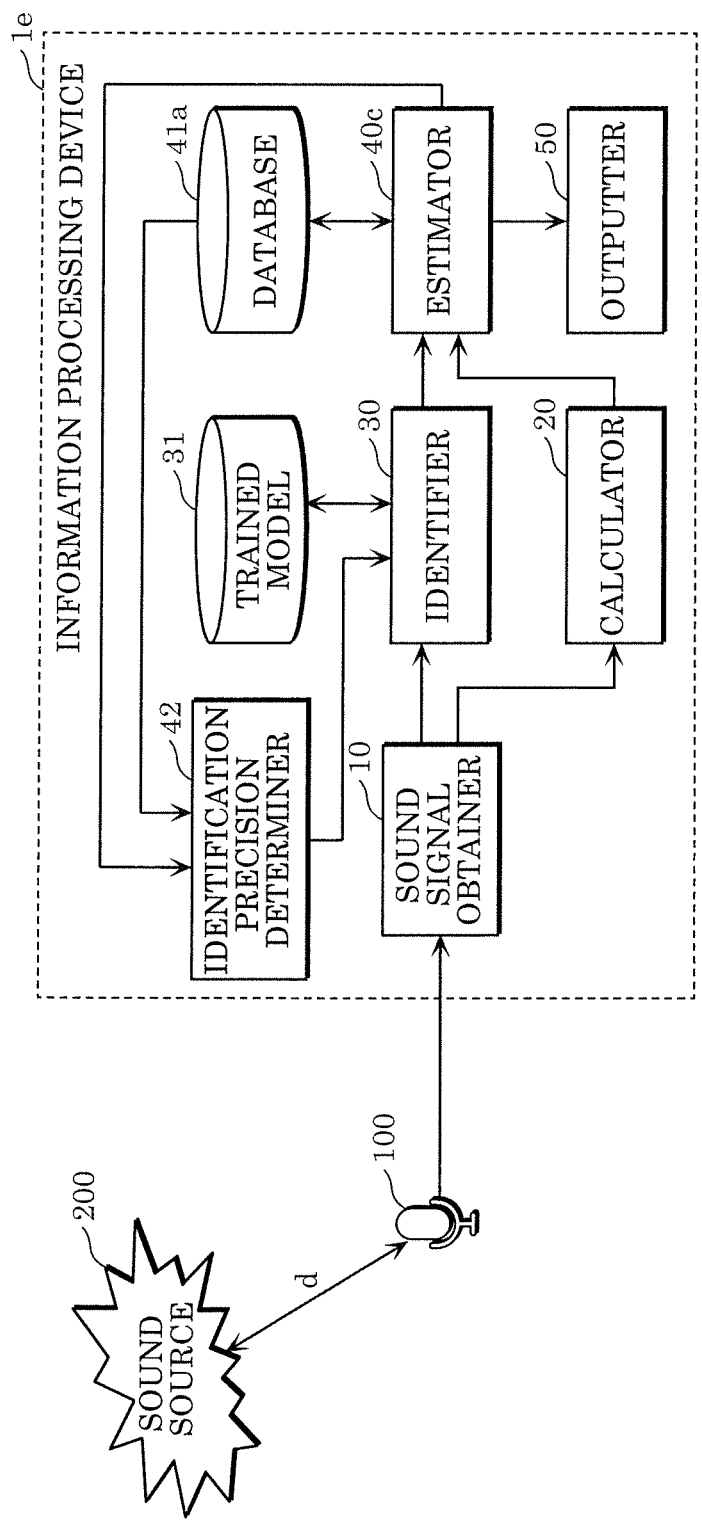
FIG. 9 is a block diagram showing an example of a configuration of an information processing device according to Embodiment 6.

FIG. 9 is a block diagram showing an example of a configuration of information processing device 1e according to Embodiment 6.

Information processing device 1e according to Embodiment 6 differs from information processing device 1 according to Embodiment 1 in that information processing device 1e further includes identification precision determiner 42. Embodiment 6 also differs from Embodiment 1 in that information processing device 1e includes estimator 40c instead of estimator 40 and database 41a instead of database 41. Since other items are the same as information processing device 1 in according to Embodiment 1, description thereof is omitted and the above differences will be mainly described.

Estimator 40c accumulates, in, for example, database 41a per distance estimation, a correspondence relationship between the type of the sound source of the sound identified by identifier 30 and the estimation result of the distance between sound collecting device 100 and the sound source. Note that database 41a is the same as database 41 aside from this correspondence relationship being accumulated. For example, a database separate from database 41 may also be disposed for accumulating this correspondence relationship.

For example, when sound is produced from a specific type of sound source, there are cases where the estimation result tends to be the same for each estimation of the distance to the sound source. This is because when a specific type of sound source is fixed in a facility, etc., the volume of the sound from the sound source tends to be the same, and the estimation result of the distance estimated using the volume of the sound also tends to be the same. It is, therefore, possible to specify the actual distance of this specific type of sound source from sound collecting device 100 to a certain degree using the tendency of the estimation result of the distance.

Identification precision determiner 42 determines a precision of the identifying of the type of sound source 200 based on (i) the accumulated correspondence relationship and (ii) the estimation result of the distance between sound collecting device 100 and sound source 200 of the sound collected by sound collecting device 100. To be specific, as long as the distance indicated by the estimation result about the type of the sound identified by identifier 30 is roughly the same as the tendency of the distance, which is associated with the type of the sound, in the correspondence relationship accumulated in database 41a, estimator 40c can estimate with high precision, i.e., identification precision determiner 42 can determine that identifier 30 identifies the type of the sound with high precision. On the other hand, when the distance indicated by the estimation result about the type of the sound identified by identifier 30 is different from the tendency of the distance, which is associated with the type of the sound, in the correspondence relationship accumulated in database 41a, estimator 40c does not estimate with high precision, i.e., identification precision determiner 42 can determine that identifier 30 does not identify the type of the sound with high precision.

Identification precision determiner 42 feeds back a determination result to identifier 30, and uses the determination result in the identifying of the type of the sound source. This feedback makes it possible to improve the precision of the identifying of the type of the sound source.

OTHER EMBODIMENTS

An information processing device in the present disclosure has been described above based on the embodiments, but the present disclosure is not limited to the foregoing. Forms obtained by various combinations of the components in the different embodiments that can be conceived by a person skilled in the art which are within the scope of the essence of the present disclosure are also included in the scope of the one or more aspects of the present disclosure.

For example, the information processing devices in Embodiments 3 to 6 may, for example, also include functionality corresponding to identifier 30a, calculator 60, distance information obtainer 70, and registerer 80 in Embodiment 2. In other words, the information processing devices in Embodiments 3 to 6 may include functionality to register the feature value and standard volume of sound from a an unidentifiable type of sound source in databases 41 and 41a.

The information processing devices in Embodiments 2 and 4 to 6 may, for example, also include functionality corresponding to audio signal obtainer 10a in Embodiment 3. In other words, the information processing devices in Embodiments 2 and 4 to 6 may include functionality for isolating the audio signals per sound source when there are a plurality of audio signals, and for performing, for each isolated sound signal, the calculating of the volume, the identifying of the type, the estimating of the distance, and the outputting of the estimation result.

The information processing devices in Embodiments 2, 3, 5 and 6 may, for example, also include functionality corresponding to estimator 40a and determiner 90 in Embodiment 4. In other words, the information processing device in Embodiments 2, 3, 5 and 6 may include functionality for determining whether the type of the sound source is a sound source that outputs audible sound or inaudible sound, and for estimating the distance in accordance with a determination result.

Sound collecting device 100 in Embodiments 2 to 4 and 6 may, for example, be sound collecting device 100a, which is a microphone array including multiple microphones. The information processing devices in Embodiments 2 to 4 and 6 may, for example, also include functionality corresponding to estimator 40b in Embodiment 5. In other words, the information processing device in Embodiments 2 to 4 and 6 may include functionality for estimating an orientation of the sound source with respect to sound collecting device 100a.

The information processing devices in Embodiments 2 to 5 may, for example, also include functionality corresponding to identification precision determiner 42 and estimator 40c in Embodiment 6. In other words, the information processing devices in Embodiments 2 to 5 may include functionality for improving the precision of the identifying of the type of the sound source.

In the above embodiments, identifiers 30 and 30a identify the type of the sound source using trained model 31, but may, for example, also not use trained model 31. Since features of the type of the sound source in the frequency spectrum and the like represented by the audio signal differ from type to type, identifiers 30 and 30a may, for example, also identify the type of the sound source by estimating the type of the sound source using the frequency spectrum and the like.

When, for example, the information processing device is implemented by a server device and the like, the functional components included in the information processing device may also be dispersed over multiple server devices.

The present disclosure can not only be implemented as an information processing device, but may also be implemented as an information processing method including processing steps that each of the components included in the information processing device perform.

To be specific, as illustrated in FIG. 2, the information processing method includes obtaining an audio signal that represents sound collected by sound collecting device 100 (step S11); calculating, using the obtained audio signal, a volume of the sound collected by sound collecting device 100 (step S12); identifying, using the obtained audio signal, a type of sound source 200 of the sound collected by sound collecting device 100 (step S13); estimating a distance between sound collecting device 100 and sound source 200 of the sound collected by sound collecting device 100 based on a standard volume and the calculated volume, the standard volume being (i) stored in database 41 in which the type of sound source 200 and the standard volume are preassociated with each other, (ii) the volume of the sound from sound source 200 at a predetermined distance, and (iii) associated with the identified type of sound source 200 (step S14); and outputting an estimation result (step S15).

These steps may, for example, be executed by a computer (computer system). The present disclosure can also be implemented as a computer program for causing the computer to execute the steps included in this method. The present disclosure can be implemented as a computer-readable, non-transitory recording medium, e.g. a CD-ROM, containing this computer program.

When the present disclosure is implemented by a computer program, each of the steps is executed by the computer program using hardware resources such as the CPU, memory, and input/output circuit of the computer. In other words, each of the steps is executed due to the CPU obtaining data from the memory, input/output circuit, or the like, calculating the data and outputting a calculation result to the memory, the input/output circuit, or the like.

The components included in the information processing device in the above embodiments may be implemented by a dedicated or general-purpose circuit. These components may be implemented as one circuit and as multiple circuits.

The components included in the information processing device in the above embodiments may be implemented as a large-scale integrated (LSI) circuit. These components may be implemented on individual chips and a portion or an entirety of the components may be implemented on one single chip. LSI may also refer to system LSI, super LSI, or ultra LSI depending on the degree of integration.

The integrated circuit (IC) is not limited to LSI, but may also be implemented by a dedicated circuit or a general-purpose processor. A field-programmable gate array (FPGA) that can be programmed or a reconfigurable processor whose settings and connections of circuit cells in the LSI can be reconfigured may also be used.

Furthermore, when new technologies replacing LSI are introduced due to the advancement of semiconductor technology, these techniques may naturally also be used to integrate the function blocks.

Additionally, forms realized by optionally combining components and functions in the embodiments that can be conceived by a person skilled in the art which are within the scope of the essence of the present disclosure are also included in the scope of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

An aspect of the present disclosure can, for example, be used as a device for identifying the location of a sound source.

What is claimed is:

1. An information processing method, comprising:
    obtaining an audio signal that represents sound collected by a sound collecting device;
    calculating, using the audio signal obtained, a volume of the sound collected by the sound collecting device;
    identifying, using the audio signal obtained, a type of a sound source of the sound collected by the sound collecting device;
    estimating a distance between the sound collecting device and the sound source of the sound collected by the sound collecting device based on a standard volume and the volume calculated, the standard volume being (i) stored in a database in which the type of the sound source and the standard volume are preassociated with each other, (ii) the volume of the sound from the sound source at a predetermined distance, and (iii) associated with the type of the sound source identified; and
    outputting an estimation result,
    wherein the distance is estimated based on a relational expression that is predetermined and denotes a relationship between (i) an amount of attenuation of the volume calculated with respect to the standard volume and (ii) the distance.

2. The information processing method according to claim 1, further comprising:
    further calculating a feature value of the audio signal when the type of the sound source of the sound collected by the sound collecting device is not identifiable using the audio signal obtained;
    obtaining distance information that indicates the distance between the sound collecting device and the sound source of the sound collected by the sound collecting device; and
    associating the feature value calculated with the volume calculated at the distance indicated by the distance information obtained, and registering the feature value and the volume as the standard volume in the database.

3. The information processing method according to claim 1, further comprising:
    isolating the audio signal per sound source when the audio signal obtained represents sound from a plurality of sound sources; and
    performing, for each sound signal isolated, the calculating of the volume, the identifying of the type, the estimating of the distance, and the outputting of the estimation result.

4. The information processing method according to claim 1, further comprising:
    determining whether the type of the sound source identified is a sound source that outputs audible sound or inaudible sound,
    wherein the distance is estimated in accordance with a result of the determining.

5. The information processing method according to claim 4,
    wherein the relational expression includes a relational expression predetermined for when the type of the sound source identified is the sound source that outputs audible sound and a relational expression predetermined for when the type of the sound source identified is the sound source that outputs inaudible sound.

6. The information processing method according to claim 1, wherein
    the sound collecting device is a microphone array including a plurality of microphones, and
    the method further comprises estimating an orientation of the sound source of the sound with respect to the sound collecting device based on a difference in sound collecting time at which the sound is collected respectively by the plurality of microphones.

7. The information processing method according to claim 1, further comprising:
    accumulating, per distance estimation, a correspondence relationship between the type of the sound source of the sound and the estimation result of the distance between the sound collecting device and the sound source;
    determining a precision of the identifying of the type of the sound source based on (i) the correspondence relationship accumulated and (ii) the estimation result of the distance between the sound collecting device and the sound source of the sound collected by the sound collecting device; and
    feeding back and using a determination result in the identifying of the type of the sound source.

8. A non-transitory computer-readable recording medium for use in a computer, the recording medium having a computer program recorded thereon for causing the computer to execute:
    the information processing method according to claim 1.

9. An information processing method, comprising:
obtaining an audio signal that represents sound collected by a sound collecting device;
calculating, using the audio signal obtained, a volume of the sound collected by the sound collecting device;
identifying, using the audio signal obtained, a type of a sound source of the sound collected by the sound collecting device;
estimating a distance between the sound collecting device and the sound source of the sound collected by the sound collecting device based on a standard volume and the volume calculated, the standard volume being (i) stored in a database in which the type of the sound source and the standard volume are preassociated with each other, (ii) the volume of the sound from the sound source at a predetermined distance, and (iii) associated with the type of the sound source identified; and
outputting an estimation result,
wherein the type of the sound source of the sound collected by the sound collecting device is identified using (i) a trained model trained with an audio signal that represents an optional sound as input data, and a type of a sound source of the optional sound as label data, and (ii) the audio signal obtained.

10. The information processing method according to claim 9, further comprising:
further calculating a feature value of the audio signal when the type of the sound source of the sound collected by the sound collecting device is not identifiable using the audio signal obtained;
obtaining distance information that indicates the distance between the sound collecting device and the sound source of the sound collected by the sound collecting device; and
associating the feature value calculated with the volume calculated at the distance indicated by the distance information obtained, and registering the feature value and the volume as the standard volume in the database.

11. The information processing method according to claim 9, further comprising:
isolating the audio signal per sound source when the audio signal obtained represents sound from a plurality of sound sources; and
performing, for each sound signal isolated, the calculating of the volume, the identifying of the type, the estimating of the distance, and the outputting of the estimation result.

12. The information processing method according to claim 9, further comprising:
determining whether the type of the sound source identified is a sound source that outputs audible sound or inaudible sound,
wherein the distance is estimated in accordance with a result of the determining.

13. The information processing method according to claim 12,
wherein the distance is estimated based on a relational expression that is predetermined and denotes a relationship between (i) an amount of attenuation of the volume calculated with respect to the standard volume and (ii) the distance, and
the relational expression includes a relational expression predetermined for when the type of the sound source identified is the sound source that outputs audible sound and a relational expression predetermined for when the type of the sound source identified is the sound source that outputs inaudible sound.

14. The information processing method according to claim 9, wherein
the sound collecting device is a microphone array including a plurality of microphones, and
the method further comprises estimating an orientation of the sound source of the sound with respect to the sound collecting device based on a difference in sound collecting time at which the sound is collected respectively by the plurality of microphones.

15. The information processing method according to claim 9, further comprising:
accumulating, per distance estimation, a correspondence relationship between the type of the sound source of the sound and the estimation result of the distance between the sound collecting device and the sound source;
determining a precision of the identifying of the type of the sound source based on (i) the correspondence relationship accumulated and (ii) the estimation result of the distance between the sound collecting device and the sound source of the sound collected by the sound collecting device; and
feeding back and using a determination result in the identifying of the type of the sound source.

16. A non-transitory computer-readable recording medium for use in a computer, the recording medium having a computer program recorded thereon for causing the computer to execute:
the information processing method according to claim 9.

17. An information processing device, comprising:
an audio signal obtainer that obtains an audio signal that represents sound collected by a sound collecting device;
a calculator that calculates, using the audio signal obtained, a volume of the sound collected by the sound collecting device;
an identifier that identifies, using the audio signal obtained, a type of a sound source of the sound collected by the sound collecting device;
an estimator that estimates a distance between the sound collecting device and the sound source of the sound collected by the sound collecting device based on a standard volume and the volume calculated, the standard volume being (i) stored in a database in which the type of the sound source and the standard volume are preassociated with each other, (ii) the volume of the sound from the sound source at a predetermined distance, and (iii) associated with the type of the sound source identified; and
an outputter that outputs an estimation result,
wherein the distance is estimated based on a relational expression that is predetermined and denotes a relationship between (i) an amount of attenuation of the volume calculated with respect to the standard volume and (ii) the distance.

18. An information processing device, comprising:
an audio signal obtainer that obtains an audio signal that represents sound collected by a sound collecting device;
a calculator that calculates, using the audio signal obtained, a volume of the sound collected by the sound collecting device;
an identifier that identifies, using the audio signal obtained, a type of a sound source of the sound collected by the sound collecting device;
an estimator that estimates a distance between the sound collecting device and the sound source of the sound collected by the sound collecting device based on a standard volume and the volume calculated, the standard volume being (i) stored in a database in which the type of the sound source and the standard volume are preassociated with each other, (ii) the volume of the sound from the sound source at a predetermined distance, and (iii) associated with the type of the sound source identified; and an outputter that outputs an estimation result, wherein the type of the sound source of the sound collected by the sound collecting device is identified using (i) a trained model trained with an audio signal that represents an optional sound as input data, and a type of a sound source of the optional sound as label data, and (ii) the audio signal obtained.

* * * * *